Dec. 19, 1961   J. F. BOINEY ET AL   3,013,916
RESINOUS COMPOSITIONS AND LAMINATED MEMBERS
PRODUCED THEREWITH
Filed July 29, 1958

WITNESSES
Edwin E. Bassler
Charles T. Board

INVENTORS
Joseph F. Boiney &
Donald E. Lindahl
BY
William G. Addison
ATTORNEY

3,013,916
RESINOUS COMPOSITIONS AND LAMINATED MEMBERS PRODUCED THEREWITH
Joseph F. Boiney, Hampton, and Donald E. Lindahl, Varnville, S.C., assignors to Westinghouse Electric Corporation, East Pittsburgh, Pa., a corporation of Pennsylvania
Filed July 29, 1958, Ser. No. 751,658
7 Claims. (Cl. 154—43)

This invention relates to resinous compositions, to laminated members produced therewith, and to methods of preparing such compositions and laminated members.

Electrical grade laminates have been prepared from sheets of cotton fabric impregnated with and bonded together by resins of the phenolic type. For many applications it is necessary that such laminates possess particularly good physical properties. The prior art cotton fabric-base phenolic laminates have not possessed the best possible combination of electrical and mechanical properties. Heretofore, improvements in the physical properties of such electrical grade laminates have been obtained only at the sacrifice of the electrical properties of the laminate.

In particular, it has been determined that the prior art phenolic resins employed in producing electrical grade cotton-base laminates have lacked sufficient bond strength to produce laminates with optimum physical properties.

The object of this invention is to provide laminated members having good electrical and physical properties, which laminated members comprise sheets of cotton fabric impregnated with and bonded together by a phenolic resin which comprises the reaction product of cresylic acid and certain substituted phenols with an aldehyde.

Another object of this invention is to provide a phenolic resin adapted for making laminated members that possess good electrical and physical properties, said phenolic resin comprising the reaction product of cresylic acid and certain substituted phenols with an aldehyde.

Other objects of this invention will, in part, be obvious and will, in part, appear hereinafter.

Figure 1:
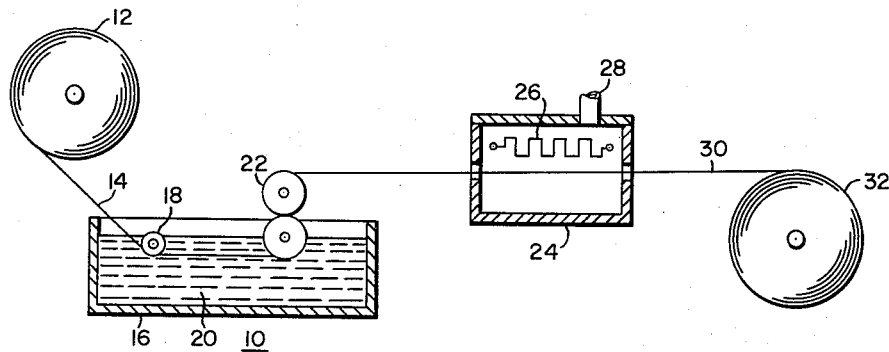
Figure 2:
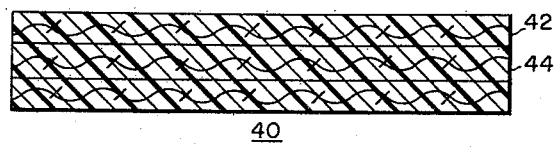

For a better understanding of the nature and objects of this invention, reference should be had to the following detailed description and drawing, in which:

FIGURE 1 is a schematic view of apparatus for applying resinous varnish to sheet fibrous material; and FIG. 2 is an enlarged, fragmentary transverse sectional view of a laminated body impregnated with resinous composition.

In accordance with this invention, there are provided laminated members comprising sheets of cotton fabric impregnated with and bonded together by a novel phenolic resin. The laminated members of this invention possess good electrical properties and good physical properties.

Further, in accordance with this invention, a novel resinous composition has been produced which is applied to sheets of cotton fabric for preparing the laminated members of this invention. The novel resin will provide an exceptionally strong bond between the layers of cotton fabric and will produce laminated members having excellent electrical and physical properties.

The novel resinous composition employed in this invention is prepared by reacting (1) one mol of a mixture of phenols consisting of (a) from 0.60 to 0.85 mol percent of a cresylic acid composition and (b) from 0.40 to 0.15 mol percent of an alkyl substituted phenol selected from the group consisting of ethyl phenols, isopropyl phenols and mixtures thereof with (2) from 0.7 mol to 1.5 mols of an aldehyde. Suitable aldehydes include formaldehyde, formalin, paraformaldehyde, butyraldehyde, chloroformaldehyde and the like, either singularly or mixtures of two or more.

An alkaline catalyst such, for example, as ammonia or an organic amine such as ethylene diamine, propylene diamine and triethanolamine or mixtures of two or more is preferably employed in an amount of from 0.1% to 2% of the weight of the phenols, to catalyze the reaction. The reaction is carried out in a conventional reaction vessel provided with condensers, stirrers and the like, under reflux and subsequent vacuum dehydration until there is produced a resin that is clear and substantially free of water. The reflux time will ordinarily be from about 15 to 75 minutes. Mixtures of ammonia and ethylene diamine have proved highly satisfactory as a catalyst in preparing the resins of this invention. An organic solvent is then added to the resin to provide a resinous impregnating varnish. Suitable organic solvents are ethanol, acetone, xylol, toluol and mixtures of two or more.

The cresylic acid composition (a) employed in admixture with component (b) in preparing the novel resinous composition of this invention is preferably one that meets the following specifications.

Engler distillation:
    Initial boiling point—about 206° C.
    More than 50% over at 210.5° C.
    More than 95% over at 220° C.
    End point (dry point)—about 225° C.
    Specific gravity (ASTM D-287)—approximately 1.0197

A product meeting the above specification consists essentially of meta- and para-cresols, and xylenols. Small amounts of phenol and ortho-cresol may be present. A satisfactory composition consists of, by weight, about 1.3% phenol, about 22% of low boiling point xylenols, about 22.4% of medium boiling point xylenols, about 14.0% of high boiling point xylenols, about 5.7% ortho-cresol and about 34.6% meta- and para-cresols.

It has been determined that a blend of alkyl substituted phenols is particularly suitable as component (b) in admixture with cresylic acid component (a) in preparing the novel resinous composition of this invention. The blend will comprise ethyl phenols and isopropyl phenols as the major ingredients, with small amounts of up to about 10% of other substituted phenols such as phenyl phenols being present. Some phenol (hydroxybenzene) may also be present.

Blends of substituted phenols that have been satisfactorily employed are those that comprise, by weight, from about 2% to 5% of phenol (hydroxy-benzene), about 8% to 10% of ortho-phenyl phenol, and from about 85% to 90% of ethyl phenols and isopropyl phenols, with about 90% of the ethyl phenols and isopropyl phenols being the paraisomer. For every part, by weight, of isopropyl phenols present, there will be from about 1.3 to 1.6 parts, by weight, of ethyl phenols present. Small amounts of the diethyl phenols and the diisopropyl phenols may also be present.

EXAMPLE I

An example of a suitable blend of substituted phenols for use in this invention is one that consists of, by weight, about 3% phenol (hydroxy benzene), 8% of orthophenyl phenol, about 51% ethyl phenols and 38% isopropyl phenols and which meets the following specification.

Engler distillation:
    Initial boiling point—about 400° F.
        10% over at about 414° F.
        50% over at about 422° F.
        90% over at about 440° F.
    End point (dry point) about 450° F.
    Specific gravity 60/60° F., about 1.020.

A specific example of the preparation of the phenolic resin of this invention is set forth in the following example:

EXAMPLE II

The following ingredients are placed in a steam jacketed reaction vessel provided with stirring mechanism and a reflux column:

| | Lbs. |
|---|---|
| Cresylic acid which meets the specification hereinbefore set forth | 12 |
| Mixture of substituted phenols of Example I | 6 |
| Formaldehyde (37% aqueous solution) | 12.25 |
| Ethylene diamine (98% aqueous solution) | .06 |
| Ammonia (28% aqueous solution) | .066 |

The ingredients are heated to reflux and reflux is continued about 30 minutes. After the reflux, the reflux column is closed off and a vacuum of 26 inches of mercury is applied to the reaction vessel to remove water from the reaction product. Vacuum dehydration is continued until a sample of the resin when removed from the reaction vessel is clear and dry to the touch. To the reaction product there are added 13 pounds of 95% ethanol to provide the impregnating varnish composition. The varnish composition has a specific gravity of 0.987 at 25° C., a viscosity of 98 centipoises at 25° C., and a set time of about 21 minutes at 153° C. The resulting resinous varnish composition is about 55% solids content.

Referring to FIG. 1 of the drawing, there is illustrated apparatus 10 for the treatment of sheets of cotton fabric in accordance with this invention. A roll 12 of fibrous sheet material comprising a sheet of cotton fabric 14 is disposed at one end of the apparatus 10. The sheet of cotton fabric 14 is withdrawn from the roll 12 and passes in a varnish dip pan 16 beneath a roller 18 immersed in the phenolic resin varnish 20 comprising the phenolic resin of this invention dissolved in a suitable solvent. The soaked cloth is withdrawn from the phenolic resin varnish 20 and passes between a pair of squeeze rolls 22 where the amount of applied varnish is controlled by the setting of the rolls. The cotton fabric sheet material is impregnated with sufficient phenolic resin of this invention to provide a resin ratio of from about 1.8 to 2.6. For optimum results it is recommended that the resin ratio be from 2.0 to 2.1. Resin ratio is defined as the ratio of the weight of the untreated fabric sheet plus the weight of the resin that is impregnated in the sheet to the weight of the untreated sheet.

The sheet of cotton cloth with the applied phenolic varnish then passes into an oven 24 having electrical heating elements 26 or other suitable heating means where the solvent from the varnish is evaporated, and the phenolic resin on the sheet advanced in cure to the B-stage. The solvent vapors escape through the stack 28 of the oven.

The heat treatment of the applied phenolic resin at this stage is conducted so that the resulting treated paper has a "greenness" of from about 1% to 3%. The greenness is determined by placing a stack of small pieces of the resin treated cotton fabric in a hot press and pressing it at a temperature of 175° C. and at a pressure of 1000 pounds per square inch for five minutes, and then weighing the amount of resin that is forced out of the stack; that is, the resin that extends beyond the cotton fabric sheet proper and determining the proportion of the exuded resin to the total weight of the sample.

The product withdrawn from the oven 24 is a sheet 30 of cotton fabric carrying B-stage phenolic resin composition and may be formed into a roll 32 for storage, cut or otherwise handled. The cotton fabric carrying the B-stage phenolic resin of this invention has good shelf life. Thus, it can be stored for a period of up to about 30 days, if desired, prior to molding of laminated members therefrom.

The following example is illustrative of the preparation of laminated members in accordance with this invention.

EXAMPLE III

Nine sheets of 3 ounce bleached cotton cloth 12 inches square and 10 mils thick are impregnated with the resinous varnish of Example II. The impregnated sheets are heated to remove the solvent from the sheets and to advance the phenolic resin to the B-stage as just described and illustrated in FIG. 1. The sheets are provided with a resin ratio of about 2.04 and a greenness of about 2.9%. The nine sheets of impregnated cotton fabric are superimposed one on the other to provide a stack which stack is consolidated into a unitary laminated member under a pressure of 1000 pounds per square inch at a temperature of about 180° C. for a period of about 50 minutes. The laminated member is allowed to cool in the press for about 30 minutes, after which it is removed and cooled to room temperature. The laminated member produced in accordance with this example has a thickness of about 1/16 inch.

Following the procedure of Example III described above, laminated members having thicknesses of 1/8 inch and 1/2 inch are also prepared.

The 1/16 inch, 1/8 inch and 1/2 inch laminated members were tested in accordance with Military Specification, MIL-P-15035B, entitled Plastic-Material, Laminated, Thermosetting: Sheets, Cotton-Fabric-Base, Phenolic-Resin. Table I below sets forth the results of these tests, which results are far superior to the minimum requirements for electrical grade cotton fabric-base phenolic resin laminates required by the subject specification.

*Table 1*

| Property Tested | Results | | |
|---|---|---|---|
| | 1/16 inch laminate | 1/8 inch laminate | 1/2 inch laminate |
| Dielectric breakdown, parallel to laminations, kilovolts | 80 | 91.7 | 48.3 |
| Bond strength, cut lengthwise, pounds | | | 1,892.5 |
| Bond strength, cut lengthwise, after immersion in distilled water for 48 hours at 50° C., pounds | | | 1,750 |
| Impact strength, tested edgewise with grain, foot-pounds per inch | | 2.11 | 2.17 |
| Impact strength, tested edgewise cross grain, foot-pounds per inch | | 1.40 | 1.27 |
| Water absorption after immersion in distilled water for 24 hours at 23° C., percent | 1.45 | 0.89 | 0.465 |
| Flexural strength with grain, p.s.i | 31,450 | 31,050 | 27,100 |
| Flexural strength cross grain, p.s.i | 26,325 | 24,850 | 22,000 |
| Power factor at one megacycle after immersion in distilled water for 24 hours at 23° C | | 0.0551 | |

Referring to FIG. 2 of the drawing there is shown a laminated member 40 prepared in accordance with this invention. The laminated member 40 comprises sheets 42 of cotton fabric impregnated with and bonded together by thermoset phenolic resin 44 of this invention.

Molding the stacks of resin impregnated cotton fabric sheets at pressure of from about 800 to 1500 p.s.i. at temperatures of from about 160° C. to 190° C. for a period of time from about 30 minutes to 60 minutes has proved to be satisfactory for producing the laminated members of this invention.

While this specification has been directed particularly to the use of sheets of cotton fabric as the filler material for use in preparing the laminated members of this invention, it will be understood that laminates can also be prepared from other fibrous sheet material such as kraft paper, glass cloth, nylon cloth, asbestos paper and the like.

Laminates prepared in accordance with this invention have good physical and electrical properties as indicated by the test results set forth in Table I. In particular, they do not deteriorate or change materially under wet or humid conditions. Further, the laminates possess a low power factor and have very good machining qualities.

It is intended that the above description and drawing shall be illustrative of the invention and not in limitation thereof.

We claim as our invention:

1. A thermosettable phenolic resin comprising the reaction product derived by reacting (1) one mol of a mixture of phenols consisting essentially of (a) from 0.60 to 0.85 mol percent of cresylic acid and (b) from 0.40 to 0.15 mol percent of a blend of alkyl substituted phenols comprising about 85% to 90% by weight of ethyl phenols and isopropyl phenols and the balance being other substituted phenols, about 90% of the ethyl phenols and the isopropyl phenols being the para isomer and for each part by weight of the isopropyl phenols present there is present from about 1.3 to 1.6 parts by weight of the ethyl phenols, and (2) from 0.7 mol to 1.5 mols of an aliphatic aldehyde, the reaction being effected in the presence of an alkaline catalyst.

2. A thermosettable phenolic resin comprising the reaction product derived by reacting (1) mol of a mixture of phenols consisting essentially of (a) from 0.60 to 0.85 mol percent of a cresylic acid composition having a boiling range of from about 206° C. to 225° C. and consisting essentially of para-cresol, ortho-cresol, meta-cresol and xylenols and (b) from 0.40 to 0.15 mol percent of a blend of alkyl substituted phenols comprising about 85% to 90% by weight of ethyl phenols and isopropyl phenols and the balance being other substituted phenols, about 90% of the ethyl phenols and the isopropyl phenols being the para isomer and for each part by weight of the isopropyl phenols present there is present from about 1.3 to 1.6 parts by weight of the ethyl phenols, and (2) from 0.7 mol to 1.5 mols of an aliphatic aldehyde, the reaction being effected in a closed reaction vessel under reflux conditions for at least 15 minutes in the presence of at least one alkaline catalyst selected from the group consisting of ammonia and amines and then vacuum dehydrated until substantially all the water is removed.

3. A phenolic resin varnish composition comprising (a) the reaction product derived by reacting (1) one mol of a mixture of phenols consisting essentially of (a) from 0.60 to 0.85 mol percent of a cresylic acid composition having a boiling range of from about 206° C. to 225° C. and consisting essentially of para-cresol, ortho-cresol, meta-cresol and xylenols and (b) from 0.40 to 0.15 mol percent a blend of alkyl substituted phenols comprising from about 85% to 90% by weight of ethyl phenols and isopropyl phenols and the balance being other substituted phenols, about 90% of the ethyl phenols and the isopropyl phenols being the para isomer and for each part by weight of the isopropyl phenols present there is present from about 1.3 to 1.6 parts by weight of the ethyl phenols, and (2) from 0.7 mol to 1.5 mols of an aliphatic aldehyde, the reaction being effected in a closed reaction vessel under reflux conditions for at least 15 minutes in the presence of at least one alkaline catalyst selected from the group consisting of ammonia and amines and then vacuum dehydrated until substantially all the water is removed, and (b) a solvent for the said reaction product.

4. In the method of making a laminated member, the steps comprising impregnating a sheet of fibrous base material to a resin ratio of from about 1.9 to 2.6 with a phenolic resin comprising the reaction product derived by reacting (1) one mol of a mixture of phenols consisting essentially of (a) from 0.60 to 0.85 mol percent of a cresylic acid composition having a boiling range of from about 206° C. to 225° C. and consisting essentially of para-cresol, ortho-cresol, meta-cresol and xylenols and (b) from 0.40 to 0.15 mol percent a blend of alkyl substituted phenols comprising from about 85% to 90% by weight of ethyl phenols and isopropyl phenols and the balance being other substituted phenols, about 90% of the ethyl phenols and the isopropyl phenols being the para isomer and for each part by weight of the isopropyl phenols present there is present from about 1.3 to 1.6 parts by weight of the ethyl phenols, and (2) from 0.7 mol to 1.5 mols of an aliphatic aldehyde, the reaction being effected in a closed reaction vessel under reflux conditions for at least 15 minutes in the presence of at least one alkaline catalyst selected from the group consisting of ammonia and amines and then vacuum dehydrated until substantially all the water is removed, and molding a plurality of sheets of the impregnated fibrous base material under heat and pressure to advance the resin to the final insoluble, infusible stage, thereby consolidating the sheets into a laminated member.

5. In the method of making a laminated member, the steps comprising impregnating a sheet of cotton fabric to a resin ratio of from about 1.9 to 2.6 with a phenolic resin comprising the reaction product derived by reacting (1) one mol of a mixture of phenols consisting essentially of (a) from 0.60 to 0.85 mol percent of a cresylic acid composition having a boiling range of from about 206° C. to 225° C. and consisting essentially of para-cresol, ortho-cresol, meta-cresol and xylenols and (b) from 0.40 to 0.15 mol percent a blend of alkyl substituted phenols comprising from about 85% to 90% by weight of ethyl phenols and isopropyl phenols and the balance being other substituted phenols, about 90% of the ethyl phenols and the isopropyl phenols being the para isomer and for each part by weight of the isopropyl phenols present there is present from about 1.3 to 1.6 parts by weight of the ethyl phenols, and (2) from 0.7 mol to 1.5 mols of an aliphatic aldehyde, the reaction being effected in a closed reaction vessel under reflux conditions for at least 15 minutes in the presence of at least one alkaline catalyst selected from the group consisting of ammonia and amines and then vacuum dehydrated until substantially all the water is removed, and molding a plurality of sheets of the impregnated cotton fabric under heat and pressure to advance the resin to the final insoluble, infusible stage, thereby consolidating the sheets into a laminated member having good electrical and physical properties.

6. A laminated member comprising a plurality of sheets of fibrous base material impregnated with and bonded together into a unitary member by a phenolic resin, said laminated member being derived by impregnating a sheet of fibrous base material to a resin ratio of from about 1.9 to 2.6 with a phenolic resin comprising the reaction product derived by reacting (1) one mol of a mixture of phenols consisting essentially of (a) from 0.60 to 0.85 mol percent of a cresylic acid composition having a boiling range of from about 206° C. to 225° C. and consisting essentially of para-cresol, ortho-cresol, meta-cresol and xylenols and (b) from 0.40 to 0.15 mol percent a blend of alkyl substituted phenols comprising from about 85% to 90% by weight of ethyl phenols and isopropyl phenols and the balance being other substituted phenols, about 90% of the ethyl phenols and the ispropyl phenols being the para isomer and for each part by weight of the isopropyl phenols present there is present from about 1.3 to 1.6 parts by weight of the ethyl phenols, and (2) from 0.7 mol to 1.5 mols of an aliphatic aldehyde, the reaction being effected in a closed reaction vessel under reflux conditions for at least 15 minutes in the presence of at least one alkaline catalyst selected from the group consisting of ammonia and amines and then vacuum dehydrated until substantially all the water is removed, and molding a plurality of sheets of the impregnated fibrous base material under heat and pressure to advance the resin to the final insoluble, infusible stage, thereby consolidating the sheets into a laminated member.

7. A laminated member comprising a plurality of sheets of cotton fabric impregnated with and bonded together into a unitary member by a phenolic resin, said laminated member being derived by impregnating a sheet of cotton fabric to a resin ratio of from about 1.9 to 2.6 with a phenolic resin comprising the reaction product derived by reacting (1) one mol of a mixture of phenols consisting essentially of (a) from 0.60 to 0.85 mol percent of a cresylic acid composition having a boiling range of from about 206° C. to 225° C. and consisting essentially of para-cresol, ortho-cresol, meta-cresol and xylenols and (b) from 0.40 to 0.15 mol percent a blend of alkyl substituted phenols comprising from about 85% to 90% by weight of ethyl phenols and isopropyl phenols and the balance being other substituted phenols, about 90% of the ethyl phenols and the isopropyl phenols being the para isomer and for each part by weight of the isopropyl phenols present there is present from about 1.3 to 1.6 parts by weight of the ethyl phenols, and (2) from 0.7 mol to 1.5 mols of an aliphatic aldehyde, the reaction being effected in a closed reaction vessel under reflux conditions for at least 15 minutes in the presence of at least one alkaline catalyst selected from the group consisting of ammonia and amines and then vacuum dehydrated until substantially all the water is removed, and molding a plurality of sheets of the impregnated cotton fabric under heat and pressure to advance the resin to the final insoluble, infusible stage, thereby consolidating the sheets into a laminated member having good electrical and physical properties.

References Cited in the file of this patent

UNITED STATES PATENTS

| | | |
|---|---|---|
| 2,097,439 | Beutner | Nov. 2, 1937 |
| 2,101,944 | Honel | Dec. 14, 1937 |
| 2,345,357 | Powers | Mar. 28, 1944 |
| 2,561,449 | Ruderman | July 24, 1951 |
| 2,683,105 | Forbes et al. | July 6, 1954 |
| 2,810,674 | Madden | Oct. 22, 1957 |